United States Patent
Lin et al.

(10) Patent No.: US 12,105,878 B2
(45) Date of Patent: Oct. 1, 2024

(54) STRESS FEEDBACK DEVICE AND VIRTUAL IMAGE DISPLAY SYSTEM

(71) Applicant: HTC Corporation, Taoyuan (TW)

(72) Inventors: Lun-Kang Lin, Taoyuan (TW); I-Han Tai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 267 days.

(21) Appl. No.: 17/688,899

(22) Filed: Mar. 8, 2022

(65) Prior Publication Data
US 2023/0084511 A1 Mar. 16, 2023

Related U.S. Application Data

(60) Provisional application No. 63/243,715, filed on Sep. 13, 2021.

(51) Int. Cl.
*G06F 3/01* (2006.01)

(52) U.S. Cl.
CPC .............. *G06F 3/016* (2013.01); *G06F 3/011* (2013.01)

(58) Field of Classification Search
CPC ........... G06F 3/016; G06F 3/011; G06F 3/014
See application file for complete search history.

(56) References Cited

U.S. PATENT DOCUMENTS

| | | | |
|---|---|---|---|
| 8,004,492 B2 | 8/2011 | Kramer et al. | |
| 9,104,271 B1* | 8/2015 | Adams | G06F 3/0233 |
| 2008/0274769 A1* | 11/2008 | Linden | G06F 1/163 |
| | | | 455/566 |
| 2009/0225046 A1* | 9/2009 | Kim | G06F 3/016 |
| | | | 345/173 |
| 2021/0096649 A1* | 4/2021 | Mok | G06F 3/016 |

OTHER PUBLICATIONS

"Office Action of Taiwan Counterpart Application", issued on Apr. 21, 2023, p. 1-p. 5.

* cited by examiner

*Primary Examiner* — Krishna P Neupane
(74) *Attorney, Agent, or Firm* — JCIPRNET

(57) ABSTRACT

A stress feedback device and a virtual image display system are provided. The stress feedback device includes a position sensor and a pressure generator. The position sensor is configured to generate a position information based on a trigger signal and send the position information to a host. The pressure generator is configured to apply a stress to a target area based on the trigger signal and adjust an intensity of the stress.

10 Claims, 3 Drawing Sheets

```
110B ⎫        110A ⎫        210 ⎫
120B ⎬ 220    120A ⎬ 210    220 ⎬ 200
130B ⎭        130A ⎭        230 ⎭
```

STRESS FEEDBACK DEVICE AND VIRTUAL IMAGE DISPLAY SYSTEM

CROSS-REFERENCE TO RELATED APPLICATION

This application claims the priority benefit of U.S. provisional application Ser. No. 63/243,715, filed on Sep. 13, 2021. The entirety of the above-mentioned patent application is hereby incorporated by reference herein and made a part of this specification.

BACKGROUND

Technical Field

The present disclosure relates to a stress feedback device and a virtual image display system, particularly to a stress feedback device and a virtual image display system capable of enhancing the user's immersion in the virtual image world.

Description of Related Art

With the advancement of the technology industry, virtual image displays for virtual reality (VR) or augmented reality (AR) are gaining its popularity in the consumer market.

In the prior art, when a user touches or pushes a virtual object in a virtual reality, the user is usually prompted with a vibration that simulates the user's feeling of contacting the virtual object. In this scenario, the prior art can only simulate the tactile sensation of touching, but cannot make the user feel the force feedback explicitly and enjoy the immersion when touching the virtual object.

SUMMARY

The present invention provides a stress feedback device and a virtual image display system capable of enhancing the user's immersive experience in the virtual image world.

The stress feedback device of the present invention includes a position sensor and a pressure generator. The position sensor is configured to generate position information based on a trigger signal and send the position information to a host. The pressure generator is coupled to the position sensor, and is configured to apply stress to a target area according to the trigger signal and adjust the intensity of the stress.

The virtual image display system of the present invention includes a first stress feedback device, a second stress feedback device, and a host. The first stress feedback device and the second stress feedback device are mutually connected to a linkage mechanism, and the first stress feedback device and the second stress feedback device are respectively disposed on a first part and a second part of a user. At least one of the first stress feedback device and the second stress feedback device includes a position sensor and a pressure generator. The position sensor is configured to generate position information based on a trigger signal. The pressure generator is coupled to the position sensor. The host is coupled to the first stress feedback device and the second stress feedback device. The host is configured to, according to the trigger signal, cause the position sensor of the first stress feedback device and the second stress feedback device to detect a relative position between the first part and the second part, and cause the pressure generator to apply stress to at least one of the first part and the second part according to the trigger signal and adjust the intensity of the stress.

Based on the above, the virtual image display system of the present invention applies stress to the upper arm and/or lower arm of the user through the pressure generator of the stress feedback device when a trigger event is activated, and the skin tension of the user is changed by the relative positions of the stress feedback devices worn and fixed on the upper arm and/or the lower arm. In this way, the present invention makes the user's brain feel the force feedback similar to a real action to thereby enhance the user's immersion in the virtual image world.

DESCRIPTION OF THE EMBODIMENTS

Figure 1:
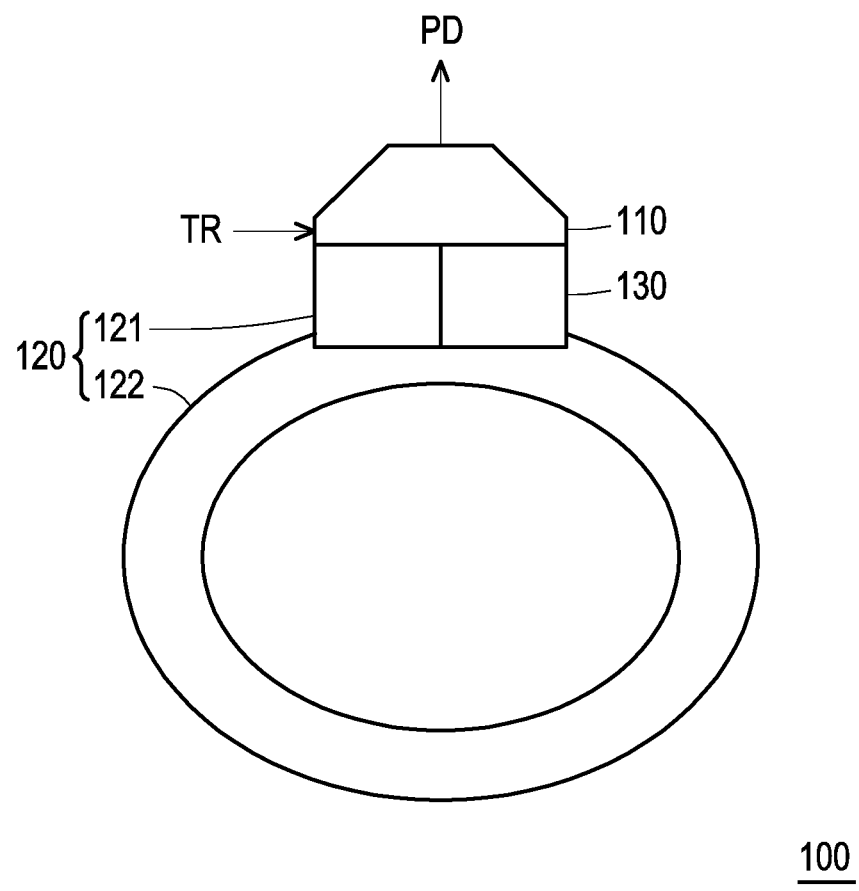
FIG. 1 is a schematic diagram of a stress feedback device according to an embodiment of the present invention.

Please refer to FIG. 1. FIG. 1 is a schematic diagram of a stress feedback device according to an embodiment of the present invention. The stress feedback device 100 includes a position sensor 110, a pressure generator 120, and a pressure and displacement detector 130. In this embodiment, the stress feedback device 100 may be worn on any part of the user's body (e.g., hands or feet). When a user performs virtual-reality operations through a host (e.g., a head-mounted display or any electronic device with computing capability), the host and the stress feedback device 100 communicate and send data wirelessly. In this way, the host may react upon the resistance or effects that the user feels when touching or interacting with the virtual object in the virtual reality to the stress feedback device 100 based on the virtual image, such that the stress feedback device 100 generates corresponding force feedbacks to enhance the immersion of the user during operation.

In this embodiment, the position sensor 110 receives a trigger signal TR, generates position information PD according to the trigger signal TR, and sends the position information PD to the host. For example, in some embodiments, when the host determines that the user's hand is required to apply pressure on the virtual object based on the virtual image (for example, turning a door knob, grasping a grip, serving a plate, etc.), it means a trigger event has been activated. At this time, the host generates the trigger signal TR to the position sensor 110 based on the trigger event. Then, the position sensor 110 senses its absolute position in the target area (e.g., the user's arm) according to the trigger signal TR, and generates the position information PD correspondingly.

In other embodiments, when the user observes that the trigger event is about to be activated based on the virtual image, the user may press a button (not shown) on the stress feedback device 100 to generate the trigger signal TR to the position sensor 110. And the position sensor 110 may sense its absolute position in the target area according to the trigger signal TR to generate the position information PD correspondingly.

In another aspect, the pressure generator 120 includes a driver 121 and a compression belt 122. The driver 121 is coupled between the position sensor 110 and the compression belt 122. The pressure and displacement detector 130 is coupled between the position sensor 110 and the pressure generator 120. The driver 121 in this embodiment may be, for example, an air pump or other types of actuating devices, but the present invention is not limited thereto. Any device capable of driving the compression belt 122 to pressurize the user may be configured to implement the driver 121 of the present invention, to which there is no specific limitations.

Specifically, the pressure generator 120 is configured to apply stress to the user's target area and adjust the intensity of the stress according to the trigger signal TR. For example, when a trigger event is activated, the pressure generator 120 drives the compression belt 122 through the driver 121 according to the trigger signal TR, and inflates the compression belt 122 to pressurize the user's arm.

Furthermore, in this embodiment, when the trigger event is activated, the stress feedback device 100 detects a stress value SV1 applied by the pressure generator 120 to the target area and a displacement value DV1 of the position sensor 110 in the target area through the pressure and displacement detector 130. Next, the pressure and displacement detector 130 obtains a comparison result CR1 by comparing the stress value SV1 with a reference stress value RSV1, and sends the comparison result CR1 to the pressure generator 120.

And the pressure and displacement detector 130 obtains a comparison result CR2 by comparing the displacement value DV1 with the reference displacement value RDV1, and sends the comparison result CR2 to the pressure generator 120.

It is worth mentioning that in this embodiment, when the pressure and displacement detector 130 determines that the stress value SV1 is not greater than the reference stress value RSV1, or that the displacement value DV1 is not smaller than the reference displacement value RDV1, the pressure generator 120 pressurizes the target area of the user through the compression belt 122 based on the comparison results CR1 and CR2.

In this way, when the user is required to touch or interact with virtual objects in the virtual reality, the stress feedback device 100 may apply stress on the user's target area (e.g., hand) according to the trigger signal TR, such that the user can have the experience of actually touching or interacting with an object.

Figure 2:
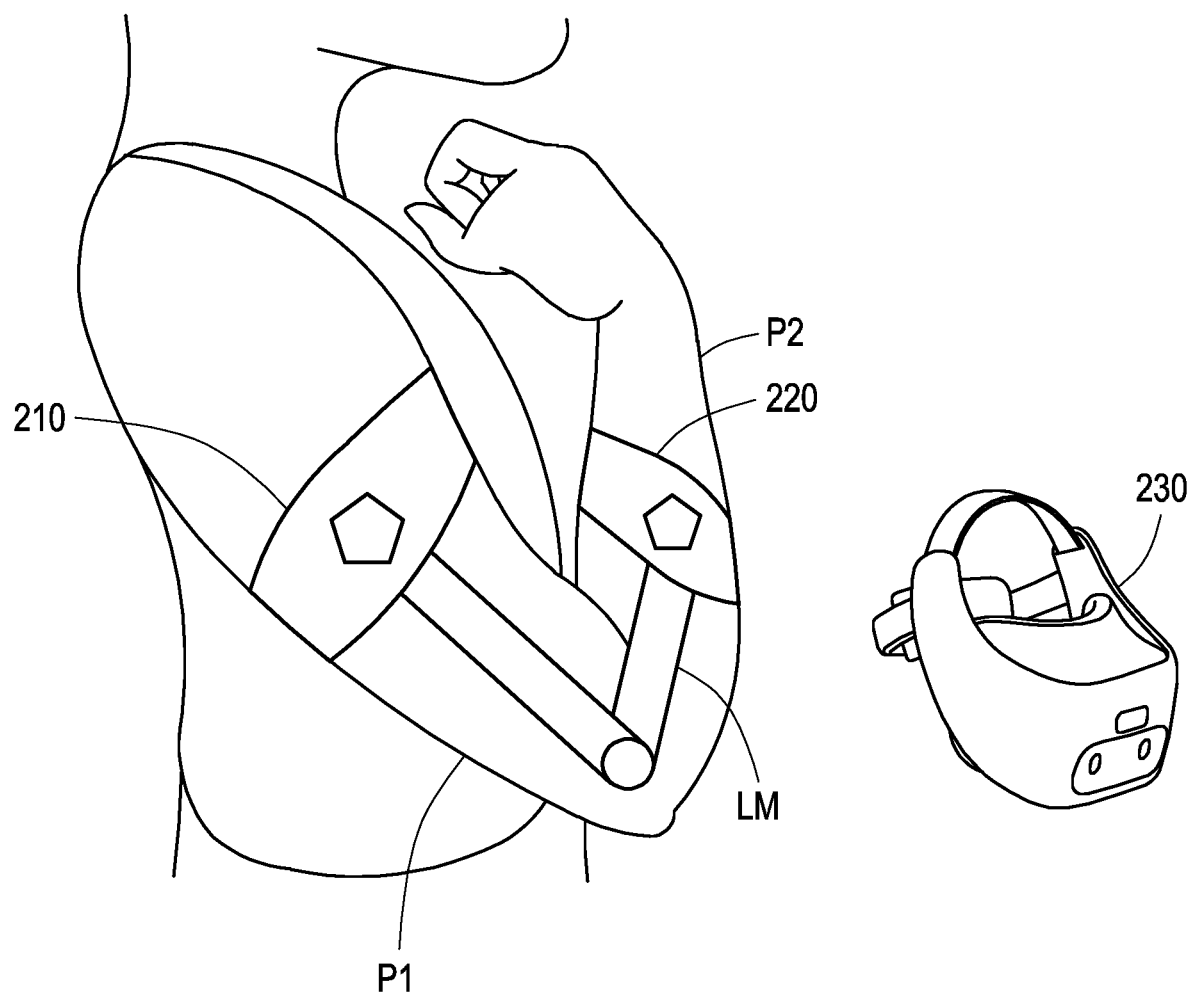
FIG. 2 is a schematic diagram of a virtual image display system according to an embodiment of the present invention.

In this regard, please refer to FIG. 1 and FIG. 2 at the same time. FIG. 2 is a schematic diagram of a virtual image display system according to an embodiment of the present invention. The virtual image display system 200 includes a stress feedback device 210, a stress feedback device 220, and a host 230. The stress feedback devices 210 and 220 may be implemented based on the stress feedback device 100 shown in FIG. 1.

In this embodiment, the host 230 may be a head-mounted display which can provides a display effect of virtual reality or augmented reality. The user may wear the stress feedback device 210 and the stress feedback device 220 respectively on the upper arm (i.e., the first part) and the forearm (i.e., the second part) of an arm on one side. The stress feedback device 210 and the stress feedback device 220 may be mutually connected to a linkage mechanism LM. The stress feedback devices 210 and 220 may communicate with and send data to the host 230 wirelessly.

Figure 3:
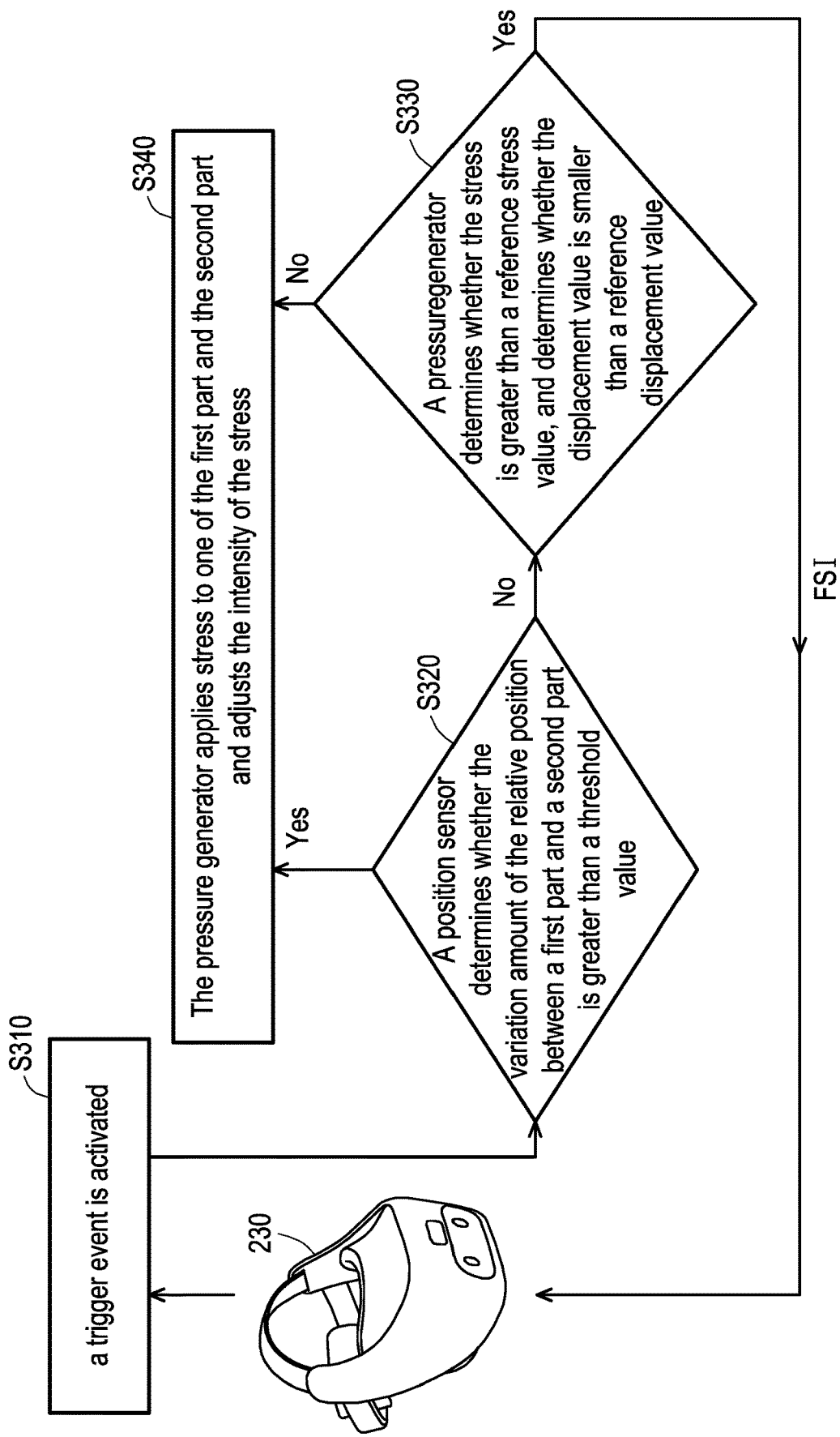
FIG. 3 is a flow chart illustrating the operation of the virtual image display system according to the embodiment of the present invention.

For the implementation details of the virtual image display system 200, please refer to FIG. 1 to FIG. 3 at the same time. FIG. 3 is a flow chart illustrating the operation of the virtual image display system according to the embodiment of the present invention. In step S310, as the host 230 determines that a trigger event is activated based on the virtual image, the host 230 may generate and send the trigger signal TR to a position sensor 110A of the stress feedback device 210 and a position sensor 110B of the stress feedback device 220.

Meanwhile, the position sensor 110A and the position sensor 110B respectively sense their position information TR on the first part P1 and the second part P2 of the user according to the trigger signal TR, and send the position information TR to the host 230. Then, the stress feedback device 210 and the stress feedback device 220 calculate the relative positions between the position sensor 110A and the position sensor 110B of the first part P1 and the second part P2 based on the position information TR.

Furthermore, in step S320, according to the trigger signal TR, the host 230 causes the position sensor 110A and the position sensor 110B to determine whether the variation amount VA of the relative position between the first part P1 and the second part P2 of the user is greater than a preset threshold value RVA to obtain a comparison result CR3.

For example, assuming that the user is required to turn a virtual object (for example, a door knob) in the virtual reality, at this time, when the position sensor 110A and the position sensor 110B determine that the variation amount VA is greater than the threshold value RVA, it indicates that the degree of turning the virtual door knob by the user is greater than the threshold value RVA. In this case, the virtual image display system 200 may continue to perform the operation in step S340.

In step S340, the host 230 may generate and send a first locking command LC1 to the pressure generator 120A of the stress feedback device 210 and/or the pressure generator 120B of the stress feedback device 220 based on the comparison result CR3. The pressure generator 120A and/or the pressure generator 120B may apply stress to the first part P1 and/or the second part P2 of the user according to the first locking command LC1, so as to fix the stress feedback device 210 and/or the stress feedback device 220 on the user's arm. Therefore, when the trigger event is activated, the virtual image display system 200 can simulate the force feedback and effects of the user touching or interacting with the virtual object in the virtual image by applying stress to the user's arm.

In contrast, when the position sensor 110A and the position sensor 110B determine that the variation amount VA is not greater than the threshold value RVA, it means that the degree of turning the virtual door knob by the user is not greater than the threshold value RVA. In this case, the virtual image display system 200 may continue to perform the operation in step S330.

In step S330, the host 230 controls the pressure and displacement detector 130A of the stress feedback device 210 and the pressure and displacement detector 130B of the stress feedback device 220 based on the comparison result CR3, so as to compare a stress value SV2 applied to the first part P1 and the second part P2 of the user with a reference stress value RSV2 to obtain a comparison result CR4. In addition, the host 230 may also control the pressure and displacement detector 130A and the pressure and displacement detector 130B based on the comparison result CR3 and compare the displacement value DV2 of the position sensor 110A on the first part P1 of the user and the displacement value DV2 of the position sensor 110B on the second part P2 of the user with a reference displacement value RDV2, so as to obtain a comparison result CR5.

For example, when the pressure and displacement detectors 130A and 130B determine that the stress value SV2 is greater than the reference stress value RSV2 and that the displacement value DV2 is smaller than the reference displacement value RDV2, it means that the force feedback felt by the user when turning the virtual door knob is large enough. In this case, the pressure and displacement detectors 130A and 130B report force-exertion state information FSI to the host 230 based on the comparison results CR4 and CR5, such that the host 230 may adjust the virtual image generated based on the force-exertion state information FSI.

In contrast, when the pressure and displacement detectors 130A and 130B determine that the stress value SV2 is not greater than the reference stress value RSV2, or that the displacement value DV2 is not smaller than the reference displacement value RDV2, it means that the force feedback felt by the user when turning the virtual door knob is not large enough. In this case, the virtual image display system 200 may continue to perform the operation in step S340.

In step S340, the host 230 may generate and send a second locking command LC2 to the pressure generator 120A and/or the pressure generator 120B based on the comparison results CR4 and CR5. The pressure generator 120A and/or the pressure generator 120B may further apply stress on the first part P1 and/or the second part P2 of the user according to the second locking command LC2, to thereby fix the stress feedback device 210 and/or the stress feedback device 220 on the user's arm. Therefore, when the trigger event is activated, the virtual image display system 200 can simulate the force feedback and effects of the user touching or interacting with the virtual object in the virtual image by applying stress to the user's arm.

To sum up, the virtual image display system of the present invention applies stress to the upper arm and/or lower arm of the user through the pressure generator of the stress feedback device when a trigger event is activated, and the skin tension of the user is changed by the relative positions of the stress feedback devices worn and fixed on the upper arm and/or the lower arm. In this way, the present invention makes the user's brain feel the force feedback similar to a real action to thereby enhance the user's immersion in the virtual image world.

What is claimed is:

1. A stress feedback device, comprising:
   a position sensor, configured to generate position information based on a trigger signal and send the position information to a host; and
   a pressure generator, coupled to the position sensor, configured to apply stress to a target area according to the trigger signal,
   wherein the pressure generator adjusts an intensity of the stress according to a first comparison result indicating a comparison between a stress value applied by the pressure generator to the target area and a reference stress value and a second comparison result indicating a comparison between a displacement value of the position sensor in the target area and a reference displacement value.

2. The stress feedback device of claim 1, further comprising:
   a pressure and displacement detector, coupled to the position sensor and the pressure generator, configured to detect the stress value applied by the pressure generator in the target area and the displacement value of the position sensor in the target area,
   wherein the pressure and displacement detector obtains the first comparison result by comparing the stress value with the reference stress value, and obtains the second comparison result by comparing the displacement value with the reference displacement value, and the pressure generator adjusts an intensity of the stress based on the first comparison result and the second comparison result.

3. The stress feedback device of claim 1, wherein the pressure generator comprises:
   a compression belt, coupled to the position sensor; and
   a driver, coupled to the position sensor and the compression belt, configured to drive the compression belt according to the trigger signal, such that the compression belt inflates and pressurizes the target area.

4. The stress feedback device of claim 3, wherein the driver is an air pump or an actuating device.

5. A virtual image display system, comprising:
   a first stress feedback device and a second stress feedback device, mutually connected to a linkage mechanism, the first stress feedback device and the second stress feedback device respectively disposed on a first part and a second part of a user, wherein at least one of the first stress feedback device and the second stress feedback device comprises:
   a position sensor, configured to generate position information based on a trigger signal; and
   a pressure generator, coupled to the position sensor; and
   a host, coupled to the first stress feedback device and the second stress feedback device, wherein the host is configured to:
   according to the trigger signal, cause the position sensor of the first stress feedback device and the second stress feedback device to detect a relative position between the first part and the second part; and
   cause the pressure generator to apply stress to at least one of the first part and the second part according to the trigger signal and adjust an intensity of the stress.

6. The virtual image display system of claim 5, wherein the pressure generator comprises:
   a compression belt, coupled to the position sensor; and
   a driver, coupled to the position sensor and the compression belt, configured to drive the compression belt according to the trigger signal, such that the compression belt inflates and pressurizes at least one of the first part and the second part.

7. The virtual image display system of claim 6, wherein the driver is an air pump or an actuating device.

8. The virtual image display system of claim 5, wherein at least one of the first stress feedback device and the second stress feedback device further comprises:
   a pressure and displacement detector, coupled to the position sensor and the pressure generator, configured to detect a stress value applied by the pressure generator on at least one of the first part and the second part and a displacement value of the position sensor between the first part and the second part displacement.

9. The virtual image display system of claim 8, wherein the host is further configured to:
   according to the trigger signal, cause the position sensor of the first stress feedback device and the second stress feedback device to determine whether a variation amount of the relative position between the first part and the second part is greater than a threshold value to obtain a first comparison result, wherein
   as the position sensor determines that the variation amount of the relative position is greater than the threshold value, the host causes the pressure generator to apply the stress on at least one of the first part and the second part based on the first comparison result, and as the position sensor determines that the variation amount of the relative position is not greater than the threshold value, the host causes the pressure and displacement detector to compare based on the first comparison result the stress value with a reference stress value to obtain a second comparison result, and to compare the displacement value with a reference displacement value to obtain a third comparison result.

10. The virtual image display system of claim 9, wherein, as the pressure and displacement detector determines that the stress value is greater than the reference stress value, and determines that the displacement value is smaller than the reference displacement value, the pressure and displacement detector reports force-exertion state information to the host based on the second comparison result and the third comparison result, and as the pressure and displacement detector determines that the stress value is not greater than the reference stress value, or determines that the displacement value is not smaller than the reference displacement value, the host causes the pressure generator to apply the stress on at least one of the first part and the second part based on the second comparison result and the third comparison result.

\* \* \* \* \*